(12) United States Patent
Ono et al.

(10) Patent No.: US 11,121,659 B2
(45) Date of Patent: Sep. 14, 2021

(54) EVALUATION DEVICE, EVALUATION METHOD AND CONTROL DEVICE

(71) Applicant: OMRON Corporation, Kyoto (JP)

(72) Inventors: Yasushi Ono, Kusatsu (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 107 days.

(21) Appl. No.: 16/485,783

(22) PCT Filed: Jan. 30, 2018

(86) PCT No.: PCT/JP2018/002919
§ 371 (c)(1),
(2) Date: Aug. 13, 2019

(87) PCT Pub. No.: WO2018/163664
PCT Pub. Date: Sep. 13, 2018

(65) Prior Publication Data
US 2020/0052634 A1    Feb. 13, 2020

(30) Foreign Application Priority Data
Mar. 10, 2017    (JP) .............................. JP2017-046170

(51) Int. Cl.
*H03K 5/00*    (2006.01)
*H02P 21/22*    (2016.01)
(Continued)

(52) U.S. Cl.
CPC .............. *H02P 21/22* (2016.02); *H02P 21/09* (2016.02); *G06F 1/3203* (2013.01)

(58) Field of Classification Search
CPC .................................. H02P 21/22; H02P 21/09
(Continued)

(56) References Cited

U.S. PATENT DOCUMENTS

2005/0238335 A1* 10/2005 Miyazaki .............. H02P 29/045
388/806
2008/0309279 A1* 12/2008 Tazawa ................... H02P 23/04
318/619
(Continued)

FOREIGN PATENT DOCUMENTS

| JP | 2003009562 | 1/2003 |
|---|---|---|
| JP | 4273560 | 6/2009 |

(Continued)

OTHER PUBLICATIONS

"Search Report of Europe Counterpart Application", dated Nov. 19, 2020, pp. 1-10.
(Continued)

*Primary Examiner* — Erick D Glass
(74) *Attorney, Agent, or Firm* — JCIPRNET (57) ABSTRACT

Provided is an evaluation device that determines the necessity of a notch filter inserted in a control system that controls an electric motor by closed loop control. The evaluation device includes: a characteristic acquisition parts for changing a parameter associated with a characteristic of the notch filter from a first value, which is a prescribed value, to a second value, and acquiring a change in a frequency response characteristic of the electric motor when the notch filter is applied; and a determination parts for determining the necessity of the notch filter based on the change in the frequency response characteristic that has been acquired.

15 Claims, 8 Drawing Sheets

(51) Int. Cl.
  *H02P 21/09* (2016.01)
  *G06F 1/3203* (2019.01)
(58) Field of Classification Search
  USPC .................................................... 318/400.13
  See application file for complete search history.

(56) References Cited

U.S. PATENT DOCUMENTS

2011/0221378 A1* 9/2011 Tazawa ................... H02P 29/50
                                                    318/619
2013/0063064 A1* 3/2013 Fujiwara ................. H02P 29/50
                                                    318/461

FOREIGN PATENT DOCUMENTS

| JP | 2012023834 | 2/2012 |
| JP | 2013089089 | 5/2013 |
| JP | 2013219884 | 10/2013 |
| JP | 2014183678 | 9/2014 |

OTHER PUBLICATIONS

"International Search Report (Form PCT/ISA/210) of PCT/JP2018/002919," dated May 1, 2018, with English translation thereof, pp. 1-3.
"Written Opinion of the International Searching Authority (Form PCT/ISA/237) of PCT/PCT/JP2018/002919," dated May 1, 2018, with English translation thereof, pp. 1-6.

* cited by examiner

Frequency (Hz) — Phase delay is improved

EVALUATION DEVICE, EVALUATION METHOD AND CONTROL DEVICE

CROSS-REFERENCE TO RELATED APPLICATION

This application is a 371 of international application of PCT application serial no. PCT/JP2018/002919, filed on Jan. 30, 2018, which claims the priority benefit of Japanese Patent Application Laid-Open (JP-A) no. 2017-046170, filed on Mar. 10, 2017. The entirety of each of the abovementioned patent applications is hereby incorporated by reference herein and made a part of this specification.

BACKGROUND

Technical Field

The disclosure relates to a technique for evaluating a control system of an electric motor.

Description of Related Art

In a closed loop control system for controlling a servo motor, if a gain is set high to improve responsiveness, resonance is likely to occur. In order to suppress resonance, a notch filter that lowers a gain in the vicinity of the resonance frequency is enabled.

On the other hand, since the notch filter degrades the phase characteristic, depending on the setting of the notch filter, the settable control band is limited, and the responsiveness is lowered. That is, in a system for controlling an electric motor, there is a problem that it is necessary to select a notch filter that can suppress resonance and maintain responsiveness.

A technique is known which automatically adjusts characteristics of the notch filter by parts of an adaptive notch filter and the like in connection with the tuning of the motor control system. However, the automatically set notch filter does not necessarily match the resonance frequency.

In order to know whether the automatically adjusted notch filter is correctly set to the resonance frequency, it is necessary to know the resonance frequency. There is a control device described in Patent Document 1, for example, as a technique for acquiring the resonance frequency. According to the control device described in Patent Document 1, the frequency response characteristics of the motor can be measured without using a special measuring instrument.

RELATED ART

Patent Document

[Patent Document 1] The Specification of Japanese Patent No. 4273560

SUMMARY

Technical Problem

However, even if the frequency response characteristics of the motor are acquired when the notch filter is in an enabled state, since the acquired frequency response characteristics include the characteristics of the notch filter, it is difficult to confirm whether the frequency to which the notch filter is applied is the frequency at which resonance actually occurs. In order to determine whether the set notch filter is really necessary, it is necessary to try removing the inserted filter on a trial basis, but if the removed filter is really necessary, the motor may oscillate and damage the device.

The disclosure has been made in consideration of the above problems, and an object of the disclosure is to provide an evaluation device which determines the necessity of a notch filter inserted in a control system of an electric motor.

Solution to the Problem

An evaluation device according to the disclosure is an evaluation device that determines the necessity of a notch filter inserted in a control system that controls an electric motor by closed loop control.

Specifically, the evaluation device includes a characteristic acquisition parts for changing a parameter associated with a characteristic of the notch filter from a first value, which is a prescribed value, to a second value, and acquiring a change in a frequency response characteristic of the electric motor when the notch filter is applied; and a determination parts for determining the necessity of the notch filter based on the change in the frequency response characteristic that has been acquired.

The notch filter has parameters (such as the center frequency, and the breadth and depth of the filter width) associated with the characteristics of the notch filter. In the disclosure, the characteristic acquisition parts temporarily changes the parameter of the notch filter inserted in the control system from the first value, which is a predetermined value, to the second value, and acquires how the frequency response characteristic of the electric motor changes when the second value is applied. Further, the determination parts determines whether the target notch filter is necessary or not based on the change in the frequency response characteristic. For example, when the second value is set so that the filter effect is smaller than the first value, it is understood that there is a sign of resonance if a peak is detected at a specific frequency.

In this way, the evaluation device according to the disclosure temporarily changes the parameter of the notch filter while the notch filter is in an inserted state and thereby determines whether the notch filter is necessary; that is, it can determine whether there is an effect of suppressing motor resonance.

Further, the parameter may be a parameter that represents a width or a depth of the notch filter, and the second value may be a parameter having a filter effect smaller than the first value.

The sign of resonance can be detected by performing a trial in a direction in which the effect of the notch filter becomes smaller (that is, in a direction in which the width and depth of the filter becomes smaller) and comparing the acquired frequency response characteristics.

Further, the characteristic acquisition parts may estimate a range of the parameter in which the control system can maintain a stable state based on an already acquired frequency response characteristic, and may set the second value within the range.

When the second value is being set, if a value far from the first value is set, the control system may leave the stable state. Therefore, when there is an already acquired frequency response characteristic, it is preferable to analyze the frequency response characteristic and set the second value within a range in which the control system does not leave the stable state.

Further, the characteristic acquisition parts may estimate that the control system can maintain a stable state when in a frequency response characteristic after the second value is set as the parameter, (1) a first gain at a first frequency at which a phase delay reaches 180 degrees becomes less than or equal to a predetermined value, and (2) a peak of a gain in a frequency band higher than the first frequency is less than or equal to the first gain.

According to this configuration, it can be efficiently estimated whether the control system can maintain the stable state or not based on an already acquired frequency response characteristic.

Further, the characteristic acquisition parts may detect that a parameter having a smaller influence on the control system than the first value exists within the range, and may notify a user of a detection result.

This is because when a parameter exists that can maintain the stable state of the control system and has a smaller influence on the control system (for example, a phase delay at a predetermined frequency becomes smaller), it is preferable to adopt the parameter.

Further, the notch filter may include a plurality of notch filters, and the determination may be performed for each of the plurality of notch filters.

Further, the determination parts may notify a user of a notch filter determined to be unnecessary among the plurality of notch filters.

The disclosure can also be applied to a form in which a plurality of notch filters are inserted in the control system. According to this configuration, the user can be notified of an unnecessary notch filter among the plurality of notch filters in an easy-to-understand way.

Further, a control device according to the disclosure is a control device that controls an electric motor by closed loop control, and the control device includes: a speed control parts for generating a torque command for rotating the electric motor; a filter parts for applying a notch filter to the torque command; a speed detection parts for detecting a rotational speed of the electric motor; a characteristic acquisition parts for changing a parameter associated with a characteristic of the notch filter from a first value, which is a prescribed value, to a second value, and acquiring a change in a frequency response characteristic of the electric motor when the notch filter is applied; and a determination parts for determining the necessity of the notch filter based on the change in the frequency response characteristic that has been acquired.

In this way, an evaluation device according to the disclosure may be incorporated into a control device of an electric motor.

Further, the filter parts may disable a notch filter determined to be unnecessary by the determination parts.

According to this configuration, a notch filter unnecessary in the configuration of the control system can be automatically disabled.

Further, the characteristic acquisition parts may detect that a parameter having a smaller influence on the control system than the first value exists within the range, and may notify a user of a detection result.

Further, the filter parts may apply the detected parameter to a notch filter.

According to this configuration, a more suitable filter setting can be automatically adopted.

Further, the disclosure can be specified as an evaluation device (a control device) including at least a part of the above parts. Moreover, it can also be specified as an evaluation method (a control method) performed by the above evaluation device (the control device). The above processing and parts can be freely combined and implemented as long as no technical contradiction arises.

Effects

According to the disclosure, the necessity of the notch filter inserted in the control system of the electric motor can be determined.

DESCRIPTION OF THE EMBODIMENTS

First Embodiment

Hereinafter, preferred embodiments of the disclosure will be described with reference to the drawings.

The control system according to the first embodiment is a system that operates a servo motor by closed loop control.

Figure 1:
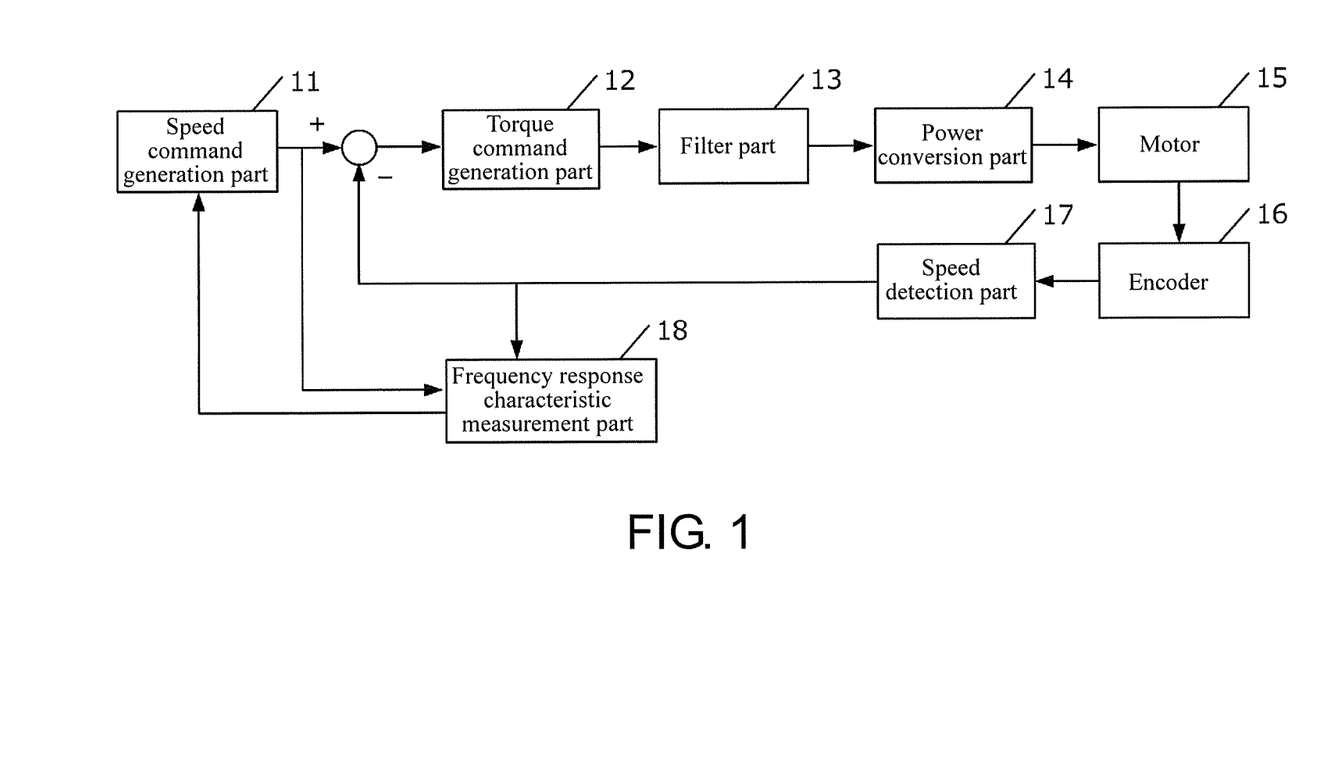
FIG. 1 is a configuration diagram of a control system according to a conventional example.

First, an example of a control system according to the prior art will be described with reference to FIG. 1.

A control system according to a conventional example is configured by including a speed command generation part 11, a torque command generation part 12, a filter part 13, a power conversion part 14, a motor 15, an encoder 16, a speed detection part 17, and a frequency response characteristic measurement part 18.

The speed command generation part 11 is a parts that generates a signal (a speed command) that commands the rotational speed of a rotor of the motor 15.

Further, the torque command generation part 12 is a parts that generates a signal (a torque command) that commands the rotational torque of the motor based on the generated speed command. As shown in the figure, the signal input to the torque command generation part 12 is a signal performed with correction based on the generated speed command and a speed detected by the speed detection part 17 to be described later.

The filter part 13 is a parts that applies a notch filter that attenuates a signal of a specific frequency band to the torque command. In the motor 15, vibration may occur during operation due to resonance characteristics with the load. Therefore, the filter part 13 performs a filter processing to attenuate a specific frequency (a resonance frequency) component from the torque command so that the caused vibration is not magnified. In this way, a gain in the vicinity of the resonance frequency is lowered, and the resonance occurring in the motor can be suppressed. Filter characteristics (such as the center frequency, the width and the depth) of the notch filter are variable, and arbitrary characteristics are given in advance by known adjustment parts (not shown).

The power conversion part 14 is a parts that generates driving power of the motor 15. The power conversion part 14 includes, for example, a conversion circuit having a switching element, such as a PWM inverter, and performs a switching operation based on the input torque command, thereby generating three-phase AC power for rotating the motor 15.

The motor 15 is an electric motor to be controlled. The motor 15 rotates the rotor by the three-phase AC power supplied from the power conversion part 14.

The encoder 16 is a position detector that detects the position of the rotor of the motor 15. The encoder 16 is typically a rotary encoder but may be a linear scale or the like.

Further, the speed detection part 17 is a parts that calculates the rotational speed based on the position (a value representing the position) of the rotor detected by the encoder 16. The speed detection part 17 calculates the speed of the rotor by, for example, differentiating a value representing the position of the rotor.

The frequency response characteristic measurement part 18 is a parts that acquires frequency response characteristics regarding the amplitude and the phase based on the speed command and the detected motor speed. The frequency response characteristic measurement part 18 acquires the response characteristics with respect to the speed command by, for example, Fourier-transforming the detected motor speed and the speed command. The acquired frequency response characteristics are fed back to the speed command generation part 11 and are used for correction of the speed command.

Further, the speed command generation part 11, the torque command generation part 12, the filter part 13, the speed detection part 17, and the frequency response characteristic measurement part 18 may be formed by computer programs or may be formed by a combination of dedicatedly designed circuits and software.

When a closed loop control system is formed as described above, selection of a notch filter is important.

Figure 2:
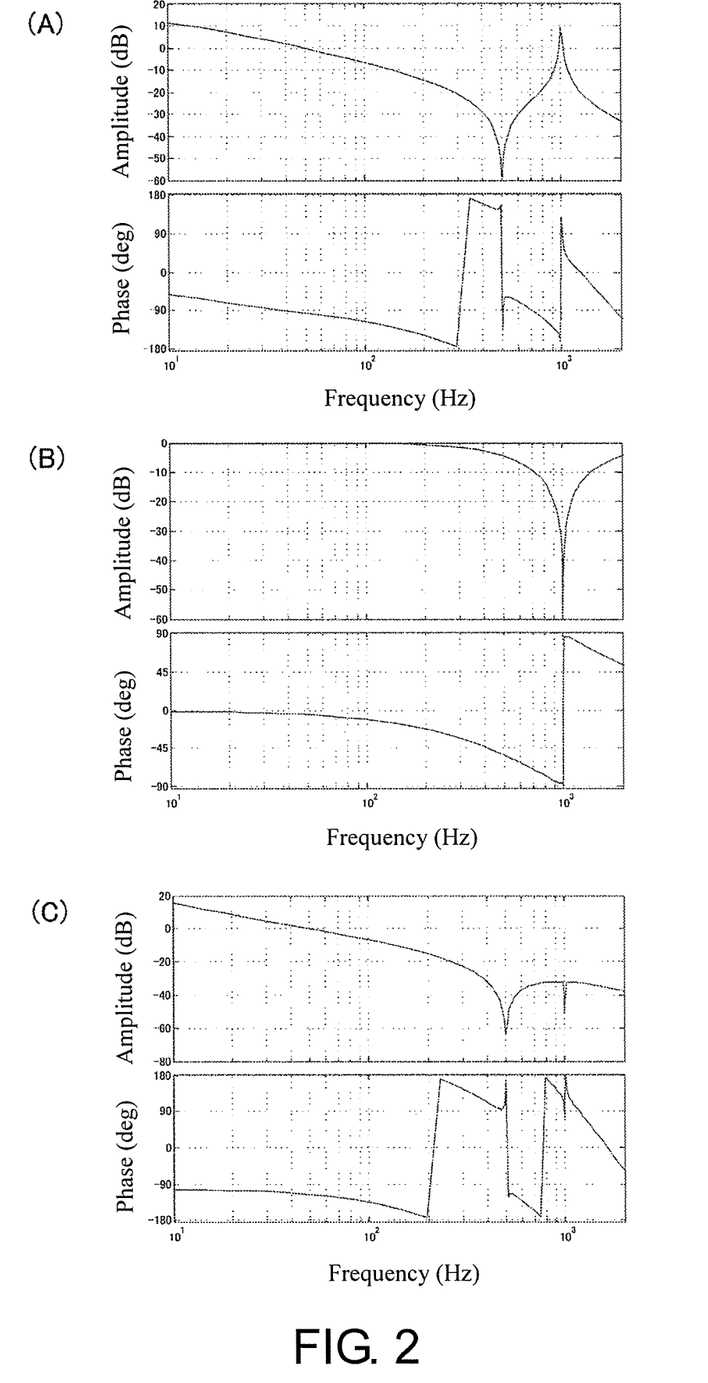
FIG. 2 is a frequency response characteristic diagram for illustrating a notch filter.

The part (A) of FIG. 2 is a diagram that illustrates the frequency response characteristics of the motor 15 in the control system. In addition, in each of the parts (A) to (C) of FIG. 2, the upper part represents the amplitude, and the lower part represents the phase. The horizontal axis is the frequency. In the case of the part (A) of FIG. 2, it can be seen that a resonance peak occurs in the vicinity of 1000 Hz.

As described above, a notch filter that attenuates a specific frequency component is used as a parts of suppressing motor resonance. For example, by applying a notch filter having the characteristics shown in the part (B) of FIG. 2, a peak existing in the vicinity of 1000 Hz can be suppressed. The part (C) of FIG. 2 is a diagram showing the frequency response characteristics after the notch filter is applied.

Figure 3:
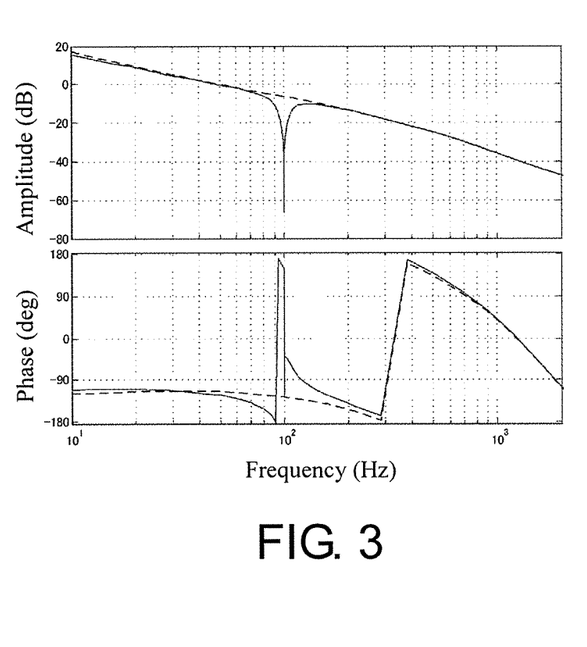
FIG. 3 is a frequency response characteristic diagram for illustrating a notch filter.

However, the notch filter set during the tuning is not necessarily applied to a frequency that matches the resonance frequency. FIG. 3 is a diagram showing frequency response characteristics obtained as a result of inserting a notch filter which is originally unnecessary. In the case of this example, as can be seen from the figure, a phase delay caused by the notch filter reaches3 −180 degrees at a frequency in the vicinity of 90 Hz. That is, it becomes a state difficult to increase the gain.

However, it cannot be known whether the notch filter is originally unnecessary or necessary without trying removing the notch filter.

The control system according to the first embodiment solves the problem by analyzing the frequency response characteristics while changing parameters of the notch filter.

A control system according to the first embodiment will be described below.

Figure 4:
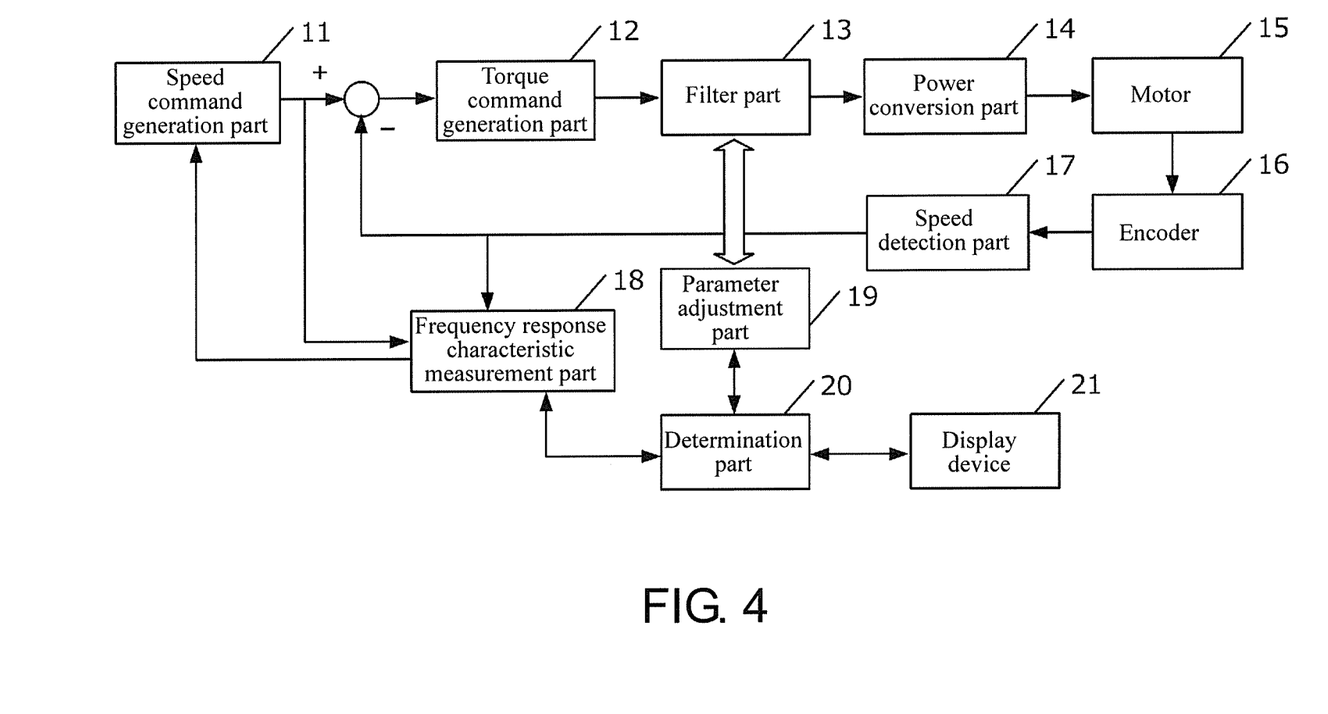
FIG. 4 is a configuration diagram of a control system according to the first embodiment.

FIG. 4 is a configuration diagram of a control system according to the first embodiment.

The control system according to the first embodiment is configured by including a speed command generation part 11, a torque command generation part 12, a filter part 13, a power conversion part 14, a motor 15, an encoder 16, a speed detection part 17, a frequency response characteristic measurement part 18, a parameter adjustment part 19, a determination part 20, and a display device 21. Among these parts, the parts other than the filter part 13, the parameter adjustment part 19, the determination part 20, and the display device 21 are the same as those described above, and thus the descriptions thereof are omitted.

In the first embodiment, the filter part 13 has a function of dynamically changing the characteristics (the parameters) of the notch filter to be applied based on a command from the parameter adjustment part 19. Further, the parameter adjustment part 19 is a parts that determines contents of the parameters to be changed. The parameter adjustment part 19 can change both the Q value (a value associated with the width of the filter) of the notch filter and the depth of the filter.

Further, the determination part 20 is a parts that evaluates the notch filter. Specifically, the determination part 20 acquires the frequency response characteristics of the motor while changing the parameters of the notch filter through the parameter adjustment part 19 and analyzes the result, thereby determining whether the initially set parameters of the notch filter are appropriate or not. The specific method will be described later.

The display device 21 is parts that displays the result of the determination performed by the determination part 20. The display device 21 may be provided separately from the control system according to the embodiment.

Figure 5:
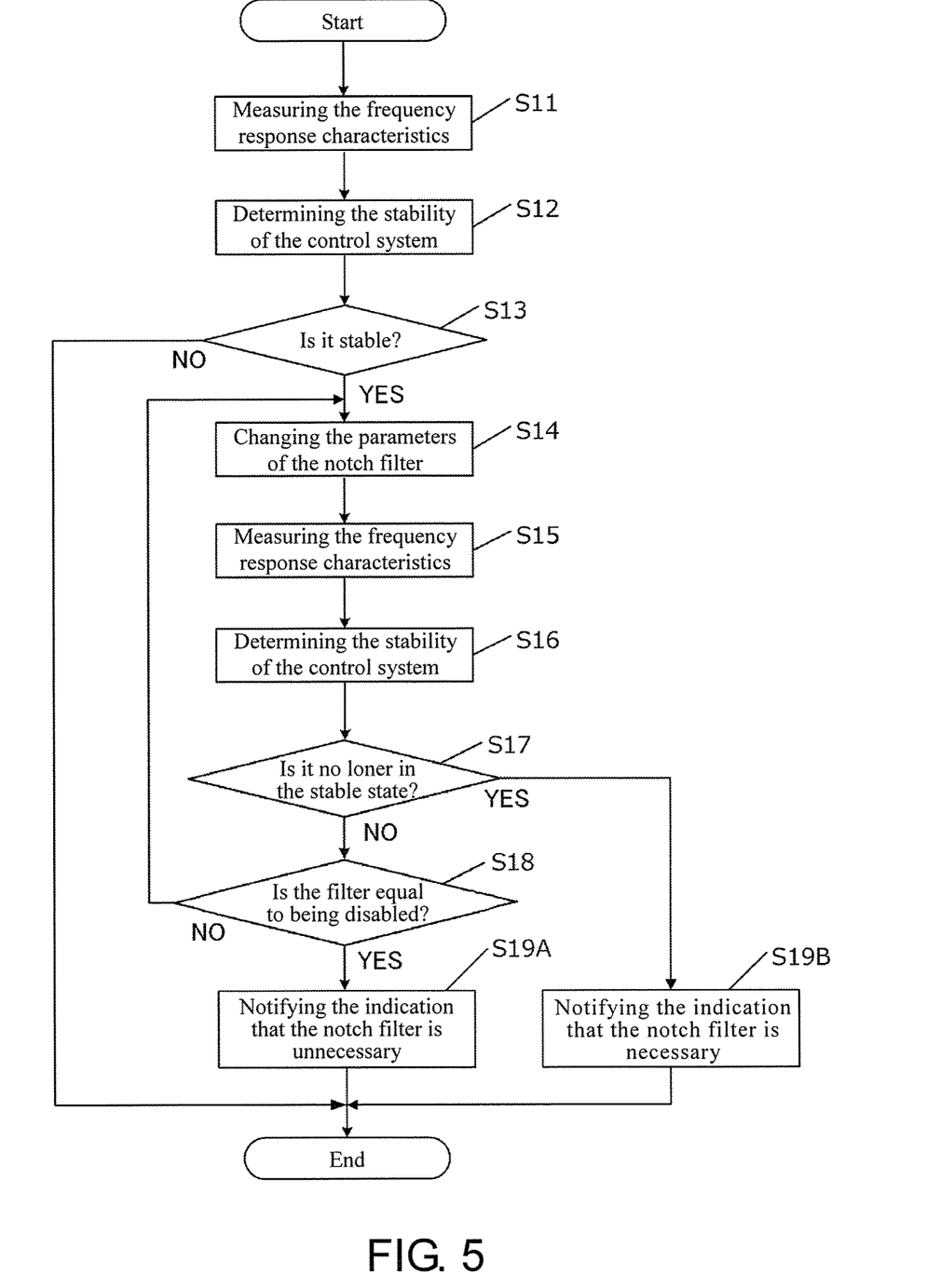
FIG. 5 is a processing flowchart of the control system according to the first embodiment.

Next, the processing of determining whether the parameters of the notch filter are appropriate will be described. FIG. 5 is a flowchart of the processing of evaluating the notch filter. The processing shown in FIG. 5 is started by an instruction of a user and executed by the determination part 20.

First, in step S11, the frequency response characteristics of the motor 15 under application of the notch filter are measured by the frequency response characteristic measurement part 18.

Next, in step S12, it is determined based on the measured frequency response characteristics whether the control system is stable or not (that is, whether there is a sign of resonance or not).

Figure 6:
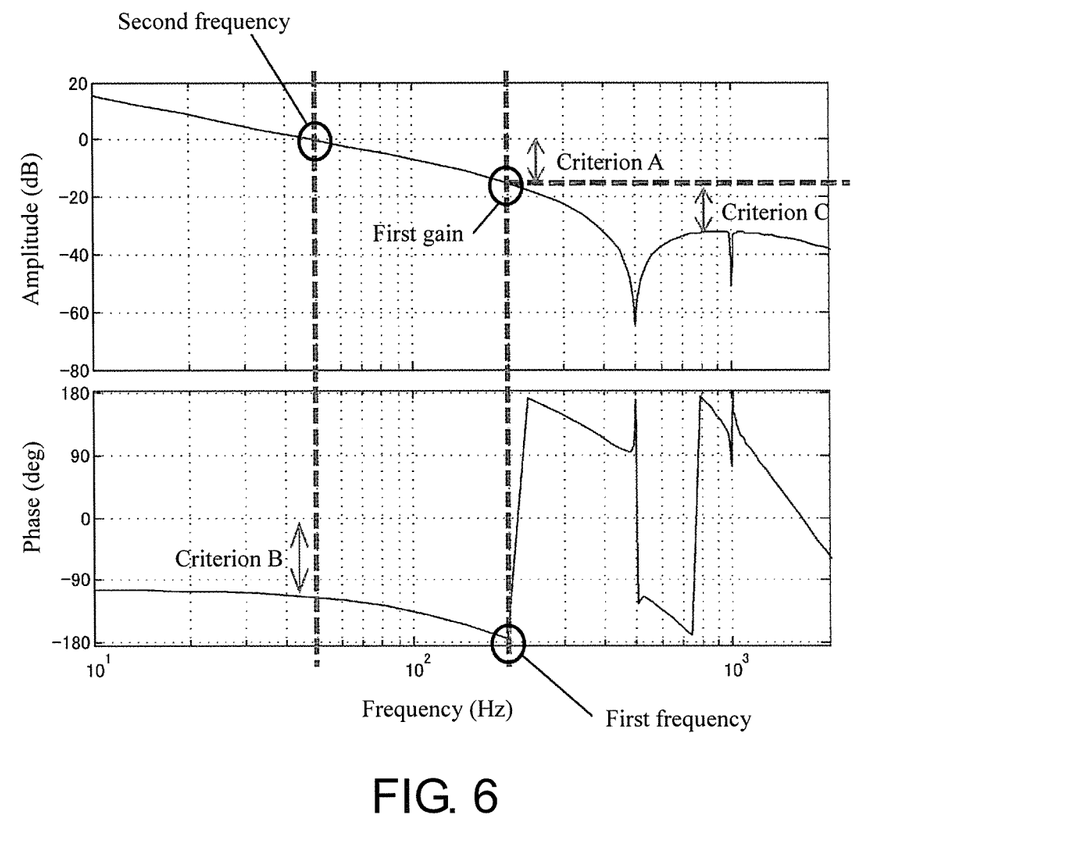
FIG. 6 is a diagram for illustrating the criteria for determining the stable state of the control system.

Here, a method of determining whether the control system is stable or not will be described with reference to FIG. 6. In the embodiment, it is determined that the control system is stable when all of the following three are satisfied.

<Criterion A>

A gain (a first gain) at a frequency (a first frequency) at which a phase delay reaches 180 degrees is less than or equal to a predetermined value. In the example of FIG. 6, the phase delay reaches 180 degrees in the vicinity of 200 Hz. If the gain at this time (slightly greater than −20 db) is greater than the predetermined value, it can be determined that the control system is not stable. In addition, in FIG. 6, the predetermined value is set to be 0 db.

<Criterion B>

The phase delay width at a frequency (a second frequency) at which the gain falls below 0 db is less than or equal to a predetermined value. In the example of FIG. 6, the gain falls below 0 db in the vicinity of 50 Hz. If the phase delay at this time is greater than the predetermined value, it can be determined that the control system is not stable.

<Criterion C>

A peak of a gain in a frequency band higher than the first frequency in the criterion A is less than or equal to the first gain. This is because when resonance occurs, it is expected that the peak of the gain appears in a frequency band higher than the frequency at which the phase delay reaches 180 degrees.

Further, if it is determined in step S12 that the control system is not stable, it is considered that the initial setting of the notch filter is incorrect, and therefore the subsequent processing is interrupted to end the processing (NO in step S13). If it is determined that the control system is stable, the processing proceeds to step S14.

In step S14, the parameters of the currently applied notch filter are changed in a direction in which the effect of the notch filter becomes smaller. For example, the width of the filter may become smaller, or the depth of the filter may become smaller.

Next, in step S15, the frequency response characteristics are measured again in the same method as in step S11. Then, in step S16, it is determined whether the control system is stable or not in the same method as in step S12.

Figure 7:
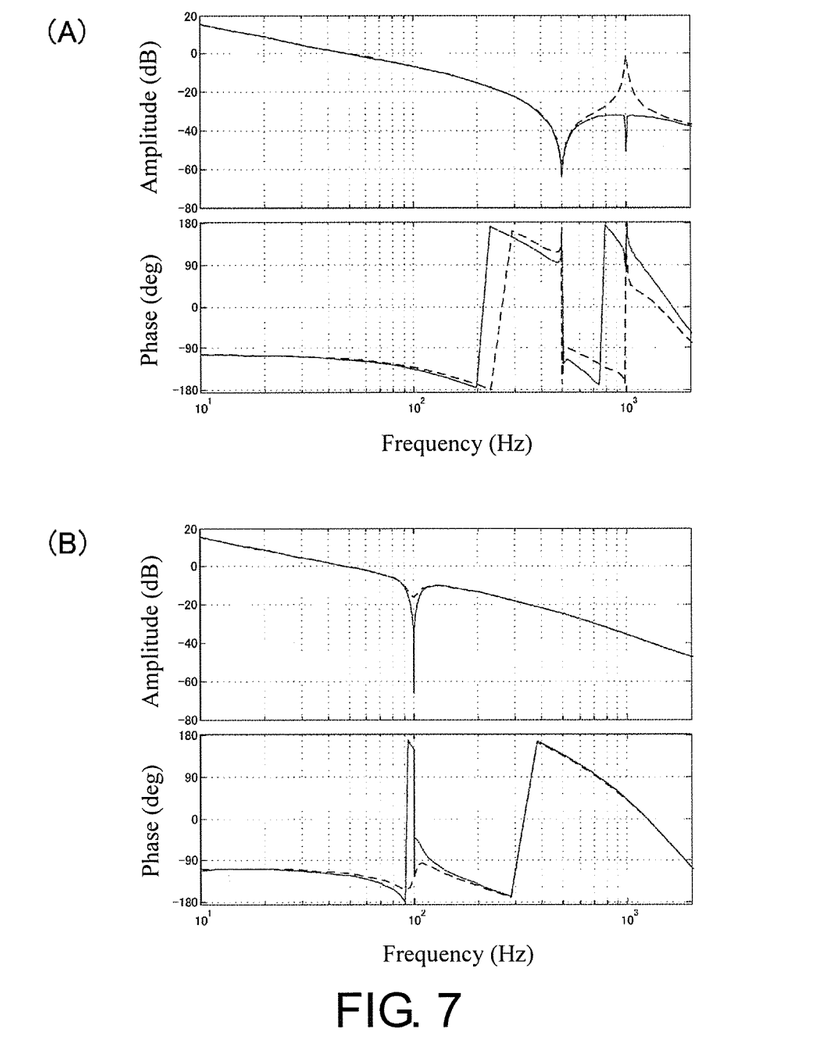
FIG. 7 is a frequency response characteristic diagram for illustrating the first embodiment.

Here, it is provisionally assumed that the characteristics indicated by solid lines in the part (A) of FIG. 7 are obtained in step S11, and that the characteristics indicated by broken lines in the part (A) of FIG. 7 are obtained in step S15. In the example of the part (A) of FIG. 7, since the peak of the gain appears in the vicinity of 1000 Hz, the above-described criterion C is not satisfied. That is, it is determined that the control system has become the unstable state (there is a sign of resonance).

If it is determined that the control system is no longer in the stable state, the processing proceeds to step S19B (YES in step S17). Then, it is notified by the display device 21 to the user of an indication that the set notch filter is necessary for the control system.

For another case, it is assumed that the characteristics indicated by solid lines in the part (B) of FIG. 7 are obtained in step S11, and that the characteristics indicated by broken lines in the part (B) of FIG. 7 are obtained in step S15. In the example of the part (B) of FIG. 7, the gain increases in the vicinity of 100 Hz, but the state in which all of the above-described criteria A to C are satisfied is maintained. That is, it is determined that the control system remains in the stable state.

If it is determined in step S16 that the control system is in the stable state, the processing proceeds to step S18.

In step S18, it is determined whether the currently applied notch filter is enabled (that is, whether the effect of the notch filter remains). Here, if it is determined that the notch filter is enabled (NO in step S18), the processing returns to step S14, and the parameters of the notch filter are further changed. That is, by repeating this processing, processing of gradually reducing the effect of the notch filter is performed under the condition that the control system is stable.

As a result of the processing described above, when the notch filter becomes equal to being disabled, it is known that the notch filter has been originally unnecessary for the control system, and therefore the processing proceeds to step S19A to notify the user of this indication.

Further, in step S18, a threshold may be provided for the parameter, and when the parameter becomes less than or equal to a predetermined value, an indication that the notch filter has become equal to being disabled may be determined.

As described above, in the first embodiment, the parameters of the notch filter are temporarily changed, and the necessity of the notch filter is determined by determining whether all of the criteria A to C are satisfied. According to such a configuration, the notch filter can be evaluated without occurrence of motor resonance.

In addition, in the first embodiment, the three criteria A to C are exemplified as the criteria for determining whether the control system is stable or not, but it is not necessary to use all of them in combination. Further, the content and the threshold of each criterion may be changed as appropriate according to the desired safety degree.

For example, in the exemplified criterion C, the determination is performed based on the frequency (the first frequency) at which the phase delay reaches 180 degrees, but the frequency may be a fixed value.

Second Embodiment

In the first embodiment, since the parameters of the notch filter are mechanically changed in step S14, a case in which the above-described criteria are not satisfied occurs during the processing of FIG. 5.

In order to cope with this, the second embodiment is an embodiment that predicts a range in which the control system can maintain the stable state and varies the parameters of the notch filter within the range.

In the second embodiment, before step S14 is executed, the change in the function of the notch filter is calculated based on the frequency response characteristics already acquired in step S11 or S15 to predict how the frequency response characteristics will change by changing the parameters. For example, in the case of the example of FIG. 6, it is predicted that the criterion C will not be satisfied if the depth of the notch filter for suppressing the signal in the vicinity of 1000 Hz is reduced by 30 db or more.

Although the frequency response characteristics after the parameters of the notch filter are changed cannot be estimated accurately, at least whether the peak will exceed the threshold or not can be simply predicted.

In the second embodiment, if it is predicted that any one of the criteria A to C will not be satisfied after the parameters are changed, a parameter that does not deviate from the criteria is estimated and selected as the changed parameter. For example, in the case of decreasing the filter depth by a predetermined value in each loop, if it is determined that the criteria will not be satisfied in the next loop, the rate of decrease is reduced so that all criteria will be satisfied.

As described above, according to the second embodiment, the parameters are varied so that the control system constantly maintains the stable state. In this way, a safer state can be ensured.

Third Embodiment

In the first and second embodiments, the user is notified only of the necessity of the currently applied notch filter. On the other hand, the third embodiment is an embodiment that notifies the user of an indication that parameters preferable to the parameters of the currently applied notch filter are discovered during the processing of FIG. 5.

When a notch filter is inserted into the control system, the gain in the vicinity of the resonance frequency can be lowered, but the phase characteristic is degraded instead. Conversely, when the effect of the notch filter is reduced, the gain in the vicinity of the resonance frequency increases, but the phase characteristic is improved.

In the third embodiment, in addition to the second embodiment, within the range in which the control system can maintain the stable state, the degree of improvement of the phase characteristic is determined, and the parameters that minimize the influence of the notch filter on the control system are identified.

Figure 8:
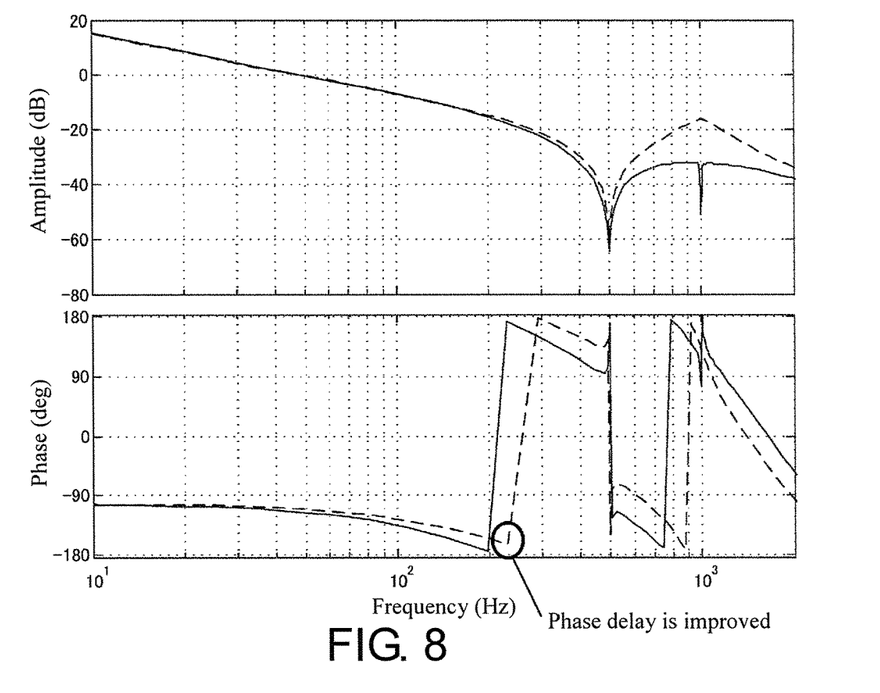
FIG. 8 is a frequency response characteristic diagram for illustrating the third embodiment.

Here, for example, it is assumed that the characteristics indicated by solid lines in FIG. 8 are obtained under the parameters before change (parameters A), and that the characteristics indicated by broken lines in FIG. 8 are obtained under the parameters after change (parameters B). In the case of the example of FIG. 8, even if the parameters are changed, all the above-described three criteria remain satisfied, and the phase delay is improved (in addition, it is assumed that the criterion C will not be satisfied if the effect of the notch filter is further reduced).

In the third embodiment, in such a case, the user is notified of an indication that the notch filter is necessary to stabilize the control system, and the user is notified of an indication that the parameters B exist as parameters more suitable than the parameters A.

According to such a configuration, not only is the necessity of the notch filter determined, but a proposal for improving the setting can also be performed.

Fourth Embodiment

In the first to third embodiments, only the evaluation result of the notch filter is notified to the user. On the other hand, the fourth embodiment is an embodiment that automatically disables the notch filter determined to be unnecessary.

In the fourth embodiment, when there is a notch filter determined to be unnecessary after the processing shown in FIG. 5 ends, the parameter adjustment part 19 notifies the filter part 13 of this indication, and the filter part 13 disables the corresponding notch filter accordingly. In this say, the control system can be automatically brought into the optimal state. Further, when the notch filter is disabled, information on the notch filter may be notified to the user.

Fifth Embodiment

Figure 9:
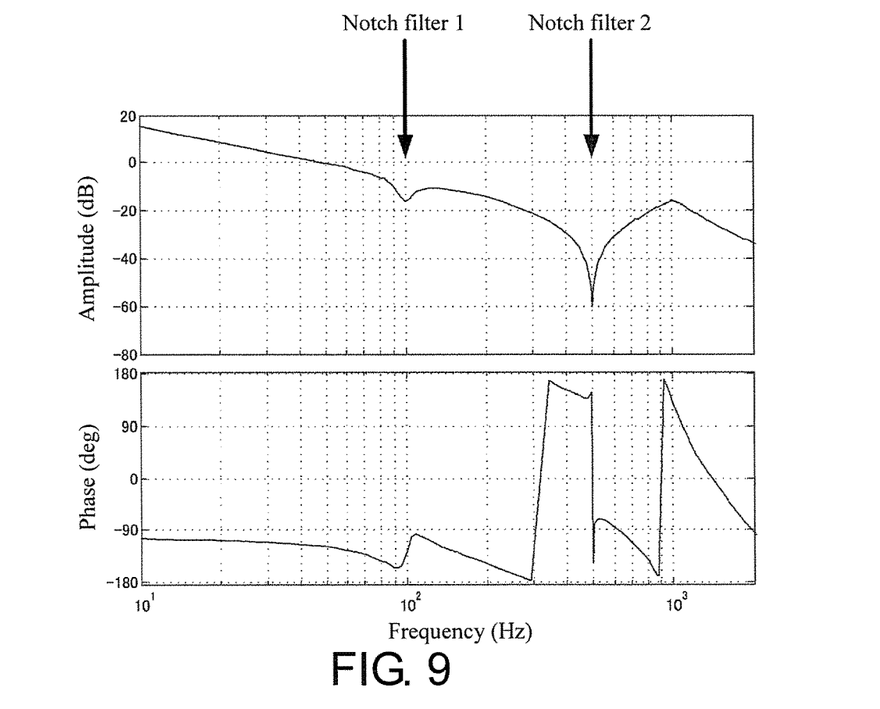
FIG. 9 is a frequency response characteristic diagram for illustrating the fifth embodiment.

In the first to fourth embodiments, the filter part 13 applies only one type of notch filter. On the other hand, the fifth embodiment is an embodiment in which the filter part 13 applies a plurality of notch filters, and the determination part 20 evaluates each of the plurality of notch filters. FIG. 9 is an example of the frequency response characteristics when a plurality of notch filters are inserted. In the example of FIG. 9, a notch filter 1 and a notch filter 2 are inserted in the control system.

In the fifth embodiment, the processing shown in FIG. 5 is executed for each applied notch filter, and determination of the necessity of each is performed.

In addition, when the user is notified of the result, for which notch filter the determination is performed is simultaneously presented. For example, an identifier or parameters of the target notch filter may be displayed. Also, a position where the target notch filter is inserted may be displayed visually.

Modified Example

In addition, descriptions of the embodiments are examples for describing the disclosure, and the disclosure can be implemented by being appropriately changed or combined without departing from the scope of the disclosure. For example, the disclosure may be implemented by combining the respective features of each embodiment.

Further, in the descriptions of the embodiments, examples are given in which the user is notified of the necessity of the notch filter and of the more suitable parameters. However, the frequency response characteristics may be graphically presented simultaneously to show the basis of the determination.

What is claimed is:

1. An evaluation device that determines the necessity of a notch filter inserted in a control system that controls an electric motor by closed loop control, the evaluation device comprising:
   a characteristic acquisition parts for changing a parameter associated with a characteristic of the notch filter from a first value, which is a prescribed value, to a second value, and acquiring a change in a frequency response characteristic of the electric motor when the notch filter is applied; and
   a determination parts for determining the necessity of the notch filter based on the change in the frequency response characteristic that has been acquired,
   wherein the parameter is a parameter that represents a width or a depth of the notch filter, and the second value is a parameter having a filter effect smaller than the first value.

2. The evaluation device according to claim 1, wherein the characteristic acquisition parts estimates a range of the parameter in which the control system can maintain a stable state based on an already acquired frequency response characteristic, and sets the second value within the range.

3. The evaluation device according to claim 2, wherein the characteristic acquisition parts estimates that the control system can maintain a stable state when a frequency response characteristic after setting the second value as the parameter is, (1) a first gain at a first frequency at which a phase delay reaches 180 degrees becomes less than or equal to a predetermined value, and (2) a peak of a gain in a frequency band higher than the first frequency is less than or equal to the first gain.

4. The evaluation device according to claim 2, wherein the characteristic acquisition parts detects that a parameter having a smaller influence on the control system than the first value exists within the range, and notifies a user of a detection result.

5. The evaluation device according to claim 1, wherein the notch filter comprises a plurality of notch filters, and the determining is performed for each of the plurality of notch filters.

6. The evaluation device according to claim 5, wherein the determination parts notifies a user of a notch filter determined to be unnecessary among the plurality of notch filters.

7. A control device that controls an electric motor by closed loop control, the control device comprising:
   a speed control parts for generating a torque command for rotating the electric motor;

a filter parts for applying a notch filter to the torque command;

a speed detection parts for detecting a rotational speed of the electric motor;

a characteristic acquisition parts for changing a parameter associated with a characteristic of the notch filter from a first value, which is a prescribed value, to a second value, and acquiring a change in a frequency response characteristic of the electric motor when the notch filter is applied; and a determination parts for determining the necessity of the notch filter based on the change in the frequency response characteristic that has been acquired, wherein the parameter is a parameter that represents a width or a depth of the notch filter, and the second value is a parameter having a filter effect smaller than the first value.

8. The control device according to claim 7, wherein the filter parts disables a notch filter determined to be unnecessary by the determination parts.

9. The control device according to claim 7, wherein the characteristic acquisition parts estimates a range of the parameter in which the control system can maintain a stable state based on an already acquired frequency response characteristic, and sets the second value within the range.

10. The control device according to claim 9, wherein the characteristic acquisition parts estimates that the control system can maintain a stable state when a frequency response characteristic after setting the second value as the parameter is, (1) a first gain at a first frequency at which a phase delay reaches 180 degrees becomes less than or equal to a predetermined value, and (2) a peak of a gain in a frequency band higher than the first frequency is less than or equal to the first gain.

11. The control device according to claim 9, wherein the characteristic acquisition parts detects that a parameter having a smaller influence on the control system than the first value exists within the range, and notifies a user of a detection result.

12. The control device according to claim 11, wherein the filter parts applies the detected parameter to a notch filter.

13. The control device according to claim 7, wherein the notch filter comprises a plurality of notch filters, and the determining is performed for each of the plurality of notch filters.

14. The control device according to claim 13, wherein the determination parts notifies a user of a notch filter determined to be unnecessary among the plurality of notch filters.

15. An evaluation method performed by an evaluation device that determines the necessity of a notch filter inserted in a control system that controls an electric motor by closed loop control, the evaluation method comprising:

a characteristic acquisition step for changing a parameter associated with a characteristic of the notch filter from a first value, which is a prescribed value, to a second value, and acquiring a change in a frequency response characteristic of the electric motor when the notch filter is applied; and a determination step for determining the necessity of the notch filter based on the change in the frequency response characteristic that has been acquired, wherein the parameter is a parameter that represents a width or a depth of the notch filter, and the second value is a parameter having a filter effect smaller than the first value.

* * * * *